(12) United States Patent
Tamura et al.

(10) Patent No.: US 6,975,309 B2
(45) Date of Patent: Dec. 13, 2005

(54) DISPLAY DRIVER, AND DISPLAY UNIT AND ELECTRONIC INSTRUMENT USING THE SAME

(75) Inventors: Tsuyoshi Tamura, Hara-mura (JP); Norio Koizumi, Suwa (JP)

(73) Assignee: Seiko Epson Cpropration, Tokyo (JP)

( * ) Notice: Subject to any disclaimer, the term of this patent is extended or adjusted under 35 U.S.C. 154(b) by 245 days.

(21) Appl. No.: 09/983,247

(22) Filed: Oct. 23, 2001

(65) Prior Publication Data

US 2002/0057265 A1 May 16, 2002

(30) Foreign Application Priority Data

Oct. 26, 2000 (JP) .............................. 2000-326873

(51) Int. Cl.[7] .............................. G09G 5/00; G09G 5/36; G06F 13/00; G06T 9/00
(52) U.S. Cl. ...................... 345/204; 345/537; 345/545; 345/555; 345/558
(58) Field of Search .............................. 345/204, 213, 345/691, 530, 531, 534, 537, 541, 545, 549, 345/555, 558, 501, 520

(56) References Cited

U.S. PATENT DOCUMENTS

| | | | |
|---|---|---|---|
| 5,289,577 A | * | 2/1994 | Gonzales et al. ........... 345/506 |
| 5,721,958 A | * | 2/1998 | Kikinis ........................ 345/555 |
| 5,809,538 A | * | 9/1998 | Pollmann et al. ........... 711/151 |
| 5,844,535 A | * | 12/1998 | Itoh et al. ..................... 345/92 |
| 5,910,827 A | * | 6/1999 | Kwan et al. ............. 375/240.27 |
| 6,104,752 A | * | 8/2000 | Yamagishi .................. 375/240 |
| 6,167,475 A | * | 12/2000 | Carr ........................... 710/113 |
| 6,175,351 B1 | | 1/2001 | Matsuura et al. ............. 345/98 |
| 6,201,927 B1 | * | 3/2001 | Comer ........................ 386/68 |
| 6,263,023 B1 | * | 7/2001 | Ngai ..................... 375/240.12 |
| 6,381,282 B1 | * | 4/2002 | Kwan et al. ........... 375/240.27 |
| 6,628,719 B1 | * | 9/2003 | Kono et al. ............. 375/240.28 |
| 6,639,602 B1 | * | 10/2003 | Fukushima et al. ......... 345/531 |

FOREIGN PATENT DOCUMENTS

| | | |
|---|---|---|
| JP | 2002-055667 | 2/2002 |
| KR | 0171233 | 10/1998 |

OTHER PUBLICATIONS

Korean Office Action regarding Korean Application No. 10-2001-0066072.

* cited by examiner

*Primary Examiner*—Bipin Shalwala
*Assistant Examiner*—Jeff Piziali
(74) *Attorney, Agent, or Firm*—Oliff & Berridge, PLC

(57) ABSTRACT

A display driver capable of implementing natural moving image display with a reduced power consumption, based on display data of following frame is generated on a cycle longer than a read cycle for display data from a built-in RAM, and a display unit and an electronic instrument having the display driver. A display driver IC with a built-in RAM stores in an FIFO memory compressed data input on a cycle longer than a drive cycle that is based on the display data, uses an MPEG decoder circuit to decompress the compressed data on a cycle substantially equivalent to the read cycle of the display data RAM to generate the display data, and writes the display data into the display data RAM prior to the read operation at a speed equal to or higher than the reading speed.

12 Claims, 11 Drawing Sheets

DISPLAY DRIVER, AND DISPLAY UNIT AND ELECTRONIC INSTRUMENT USING THE SAME

Japanese Patent Application No. 2000-326873, filed on Oct. 26, 2000, is hereby incorporated by reference in its entirety.

TECHNICAL FIELD

The present invention relates to a display driver, and a display unit and electronic instrument using the same.

BACKGROUND

Recent development of communications technology, mount technology, and the like has enabled the display of, not only numbers and characters, but also various types of data valuable for users as information such as still images and moving images, in a display section of a portable electronic instrument.

Various data formats have been proposed for data displayed in the electronic instrument. Taking a portable telephone as an example, technology for receiving or transmitting image data compressed and encoded according to the MPEG (Moving Picture Experts Group) standard has been proposed.

For example, the MPEG-4 standard takes into consideration various types of applications such as streaming distribution through the Internet, portable multimedia information terminals, and multimedia broadcasting. The MPEG-4 standard is standardized as a multimedia coding method capable of increasing efficiency of the conventional MPEG-1 and MPEG-2 coding standards. Moreover, the MPEG-4 standard enables object operations which realize synthesis of computer graphics (CG) images and music, and the like.

SUMMARY

One aspect of the present invention provides a display driver which drives a display section based on display data read from a built-in random access memory (RAM) in a given read cycle, comprising:

a first-in-first-out (FIFO) memory circuit for sequentially storing compressed data which is obtained by compressing display data and is inputted to the FIFO memory circuit on a cycle longer than the read cycle, and for outputting the compressed data according to the order of storage;

a decompression circuit which decompresses the compressed data outputted from the FIFO memory circuit;

the RAM which stores the display data of at least one frame, the display data having been outputted from the decompression circuit on the read cycle; and a display driver circuit which drives the display section based on the display data stored in the RAM.

Another aspect of the present invention provides a display driver which drives a display section based on display data read from a built-in random access memory (RAM) in a given read cycle, comprising:

a decompression circuit for decompressing compressed data which is obtained by compressing display data and is inputted to the decompression circuit on a cycle longer than the read cycle;

a first-in-first-out (FIFO) memory circuit which sequentially stores the display data decompressed by the decompression circuit and outputs the display data on the read cycle according to the order of storage;

the RAM for storing the display data of at least one frame outputted from the FIFO memory circuit; and a display driver circuit for driving the display section based on the display data stored in the RAM.

DETAILED DESCRIPTION OF THE EMBODIMENT

Figure 1:
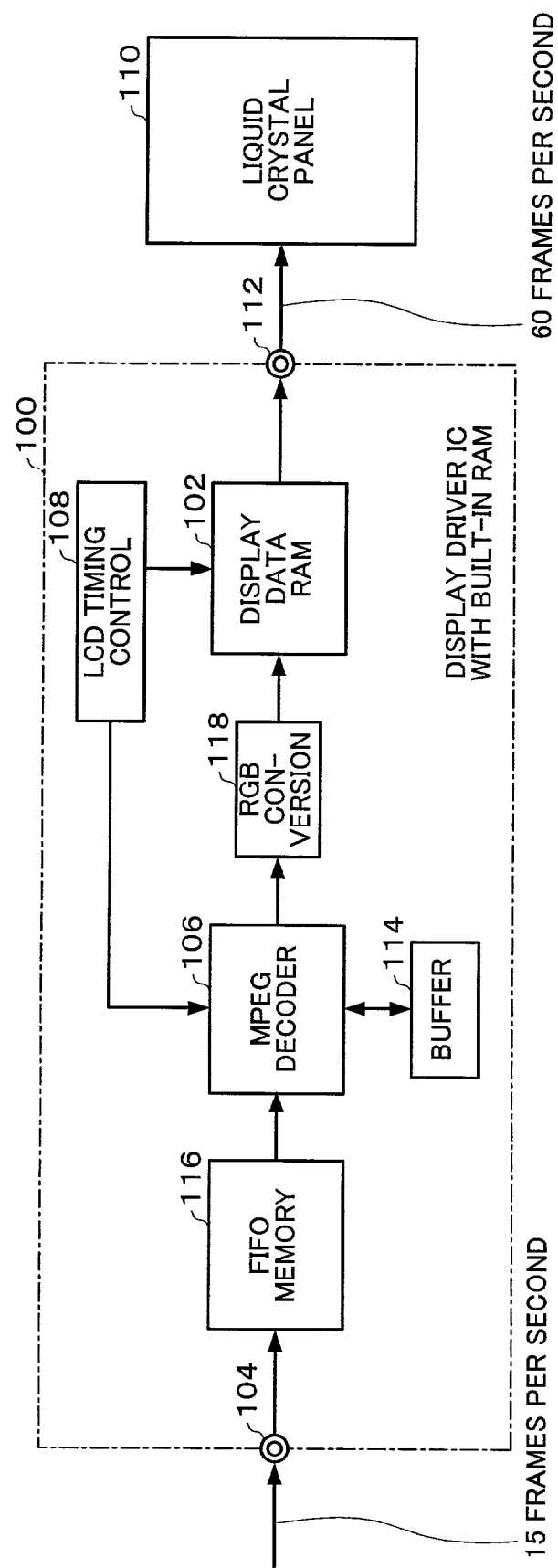
FIG. 1 is a schematic block diagram of a display driver IC with a built-in RAM to which the display driver according to the embodiment of the present invention is applied.

An embodiment of the present invention is described below.

Note that the embodiment described below does not in any way limit the gist of the present invention laid out in the claims herein. In addition, all of the components in the configuration described for the embodiment are not the requirements the present invention.

The MPEG-4 standard deals with a wide variety of image formats ranging from a QCIF (Quarter Common Intermediate Format) to an HDTV (High Definition Television) with flexibility, and covers a range from a low bit rate of less than 64 kbps (bits per second) to a high bit rate of 1.5 Mbps or more. The MPEG-4 standard also strengthens error robustness taking into consideration a wireless environment including mobile applications.

In the MPEG-4 standard, the most suitable profiles for various types of applications are standardized as an integrated standard. The simple profile is standardized for mobile applications as the most compact standard, in which only video coding and error robustness common to all the profiles are specified.

The MPEG-4 video coding standard enables efficient encoding of video using the Huffman coding by combining MC (Motion Compensated Interframe Prediction Coding) and DCT (Discrete Cosine Transform) in the same manner as in the MPEG-1 and MPEG-2 standards.

In the MPEG-4 error robustness standard, data recovery functions are secured by packetizing encoded data and inserting a resynchronization signal into every packet, or enabling decoding in the reverse direction for encoded data rows (bitstreams), for which a lack of data is expected due to a wireless environment, by employing an RVLC (Reversible Variable Length Code).

Video and audio signals encoded according to the MPEG-4 standard are generally transmitted in a multiplexed state. The multiplexing is performed between video signals and audio signals which must be synchronized, or between these signals and other CG data, text data, and the like.

Therefore, various signals (video signals, audio signals, and the like) are demultiplexed by a decoder from a multiplexed bitstream. These signals are supplied to corresponding reproducing devices (display device and audio output device), whereby various types of multimedia information can be output.

Conventionally, the decoder demultiplexes encoded video data and encoded audio data from the multiplexed bitstream, for example. Each piece of the demultiplexed encoded data is supplied to corresponding MPEG-4 decoder circuits. The decoder circuit for MPEG-4 encoded video data outputs a decoded video signal to a display section. The decoder circuit for MPEG-4 encoded audio data outputs a decoded audio signal to a speaker.

A decoder IC provided with decoder circuits for various types of MPEG-4 encoded data is integrated on a single chip. Data decoded by each decoder circuit is supplied to corresponding reproducing devices, thereby enabling output of multimedia information and the like.

However, in the case where a display device including a liquid crystal panel or the like is used as the reproducing device, compressed data in which display data is compressed is supplied to the decoder circuit every $1/15$ of a second, thereby causing the sense of incongruity to occur relating to the connection with the previous frame for moving images displayed in a display region of the display section including a liquid crystal panel and the like.

The reasons therefor are as follows. The display data is read every $1/60$ of a second from a frame buffer for storing the display data in order to drive the display section of the liquid crystal panel or the like, taking into consideration human visual characteristics. However, the decoded display data is written into the frame buffer asynchronously with this read timing. Specifically, the display data for two continuous frames is present in the display data for one frame stored in the frame buffer. Therefore, in the case where the display data is read every $1/60$ of a second taking into consideration the human visual characteristics, a sense of incongruity occurs relating to the connection between two continuous frames.

In the case of applying a single chip MPEG decoder IC to portable telephones as mobile applications, each IC which makes up the equipment is connected through a bus through which decoded display data is transmitted. Therefore, current is consumed in driving a large amount of decoded data transmitted through the bus outside the IC, thereby increasing the power consumption.

In particular, in the case of applying a general-purpose single chip IC as the MPEG-4 decoder circuit in mobile applications, such a single chip IC is generally over specification, thereby increasing the size, cost, and power consumption of the equipment. This makes it difficult to provide an electronic instrument with an optimum configuration meeting user needs. Therefore, it is preferable to provide only the most suitable decoder circuits for each type of media information which makes up multimedia information.

The embodiment of the present invention has been achieved in view of the above technical problems. This embodiment can provide a display driver capable of achieving moving image display without causing a sense of incongruity to occur with a small power consumption even if display data in the next frame is generated on a cycle longer than a read cycle for display data from a built-in RAM, and a display unit and an electronic instrument having the display driver.

According to the embodiment of the present invention, there is provided a display driver which drives a display section based on display data read from a built-in random access memory (RAM) in a given read cycle, comprising:

a first-in-first-out (FIFO) memory circuit for sequentially storing compressed data which is obtained by compressing display data and is inputted to the FIFO memory circuit on a cycle longer than the read cycle, and for outputting the compressed data according to the order of storage;

a decompression circuit which decompresses the compressed data outputted from the FIFO memory circuit;

the RAM which stores the display data of at least one frame, the display data having been outputted from the decompression circuit on the read cycle; and a display driver circuit which drives the display section based on the display data stored in the RAM.

The display data may include not only moving image data, but also still image data.

In the case where the read cycle for reading the display data to be driven by the display driver circuit from the built-in RAM is set at 60 frames per second taking into consideration human visual characteristics, compressed data input on a cycle longer than the read cycle is stored in the FIFO memory circuit. When allowing the decompression circuit to decompress the compressed data stored in the FIFO memory circuit, the decompression results are output on the read cycle and written into the RAM which stores the display data for at least one frame. This enables the display data in the next frame to be written into the RAM as a frame buffer in synchronization with the fixed read cycle, thereby preventing the display data from being read from the RAM in a state in which the display data for two continuous frames is present in the RAM. Therefore, visibility of moving image display can be significantly improved.

The decompression cycle for the decompression circuit is not limited insofar as the display data to be written into the RAM is generated on a cycle equivalent to the read cycle.

In this embodiment, read of the display data from the RAM by the display driver circuit may be performed for every scan line at a given reading speed; and write of the display data decompressed by the decompression circuit into the RAM may precede the read of the display data from the RAM by at least one scan line, and may be performed at a speed equal to or higher than the reading speed.

The read speed used herein refers to the speed for reading the display data for one scan line in a storage region of the RAM corresponding to one scan line in a display region of the display section.

Therefore, in the write of display data, the write operations precedes the read operations, and the write speed for one scan line is made equal to or higher than the read speed for one scan line, so that the read operations can be prevented from being performed earlier than the write operations into the memory. This ensures that the display data read from the RAM can with certainty be the display data in the new frame. This eliminates occurrence of a sense of incongruity relating to the connection with the previous frame, whereby visibility of moving images can be significantly improved.

In this embodiment, write of the display data of each frame into a part of storage region of the RAM corresponding to a scan line to be displayed may precede read of the display data from that part of the storage region.

In the scan line to be displayed, since the display data stored in the storage region for which the read operations are performed has been written for each frame, the display data to be read can with certainty be the new display data in that frame. This applies not only to the case of reading the display data for each scan line, but also to the case where the display data for four scan lines is read at the same time by an MLS (Multi Line Selection) drive with four line simultaneous selection, for example. Therefore, in the case where the display section is a liquid crystal panel, the liquid crystal panel may be a TFT or active matrix liquid crystal display panel. The display driver can be applied for driving a simple matrix liquid crystal display panel.

In this embodiment, the decompression circuit may operate based on a given operation clock; and the display driver may include a circuit which suspends the operation clock in a case where the display data of at least one frame decompressed by the decompression circuit is outputted to the RAM.

Since the compressed data subject to decompression by the decompression circuit is supplied only on a cycle longer than the read cycle from the RAM, current consumption accompanying the operations during a period in which the decompression results are not needed can be decreased by suspending the operation clock during a period in which the decompression operations are not performed.

In this embodiment, the decompression circuit may start decompression of the compressed data from the FIFO memory circuit, based on a vertical synchronization signal that represents start of read of the display data of one frame from the RAM.

The vertical synchronization signal indicates the start of reading of the display data stored in the RAM in order to allow the display for one frame to be started.

Since output timing of the decompression circuit can be easily controlled based on the vertical synchronization signal, control of the read timing from the RAM and the write timing into the RAM can be simplified.

According to the embodiment of the present invention, there is also provided a display driver which drives a display section based on display data read from a built-in random access memory (RAM) in a given read cycle, comprising:

a decompression circuit for decompressing compressed data which is obtained by compressing display data and is inputted to the decompression circuit on a cycle longer than the read cycle;

a first-in-first-out (FIFO) memory circuit which sequentially stores the display data decompressed by the decompression circuit and outputs the display data on the read cycle according to the order of storage;

the RAM for storing the display data of at least one frame outputted from the FIFO memory circuit; and a display driver circuit for driving the display section based on the display data stored in the RAM.

In the case where the read cycle for reading the display data to be driven by the display driver circuit from the built-in RAM is set at 60 frames per second, taking into consideration human visual characteristics, compressed data input on a cycle longer than the fixed read cycle is decompressed by the decompression circuit and stored in the FIFO memory circuit. The decompressed data is output from the FIFO memory circuit on the read cycle and written into the RAM which stores the display data for at least one frame. This enables the display data in the next frame to be written into the RAM as a frame buffer in synchronization with the fixed read cycle, thereby preventing the display data from being read from the RAM in a state in which the display data in two continuous frames is present in the RAM. Therefore, visibility of moving image display can be significantly improved.

The decompression cycle for the decompression circuit is not limited insofar as the display data to be written into the RAM is generated on a cycle equivalent to the read cycle.

The display driver according to the embodiment of the present invention may further comprise: an input terminal to which the Compressed data is inputted; and an output terminal which outputs a signal for driving the display section based on the display data stored in the RAM.

In this embodiment, the display driver is integrated in a semiconductor device. This prevents each IC which makes up the equipment from being connected through a bus through which decoded display data is transmitted by providing the built-in decompression circuit in addition to the RAM. Therefore, the amount of current consumed in driving a large amount of decoded data can be significantly decreased.

In the embodiment of the present invention, the compressed data inputted to the input terminal may be obtained by demultiplexing multiplexed data formed by multiplexing one or more types of compressed data; and the decompression circuit may perform decompression based on the compressed data demultiplexed from the multiplexed data.

Even if the multiplexed data in which encoded data corresponding to various types of media is input, it suffices to provide only a built-in decompression circuit according to the standard suitable for the display section, for example, without changing the sections in the equipment corresponding to other media. This enables the configuration of an electronic instrument capable of processing multimedia information to be simplified.

The compressed data may be compressed according to a given compression standard.

The given compression standard may be the MPEG standard.

Since the data is compressed or decompressed by performing general-purpose compression or decompression operations according to the standard, an electronic instrument according to the present invention can be provided at low cost.

The embodiment of the present invention provides a display unit comprising: any of the above described display drivers, and a display section driven by the display driver.

The embodiment of the present invention further provides a display unit comprising: a panel having an electrooptical element driven by a plurality of first electrodes and a plurality of second electrodes; any of the above described display drivers which drives the plurality of first electrodes; and a scan driver which drives the plurality of second electrodes.

A display unit capable of decreasing power consumption and excelling in visibility can be thus provided.

The embodiment of the present invention also provides an electronic instrument comprising:

any of the above described display drivers;

a demultiplexer circuit which demultiplexes compressed data corresponding to the display driver from multiplexed data obtained by multiplexing one or more types of compressed data to supply the demultiplexed compressed data to the display driver; and a display section driven by the display driver.

Even if multiplexed data is input in which encoded data corresponding to various types of media is multiplexed, it suffices to provide only a built-in decompression circuit according to the standard suitable for the display section, for example, without changing the sections in the equipment corresponding to other media. Therefore, an electronic instrument having a configuration suitable for multimedia information processing can be provided.

The electronic instrument according to the embodiment of the present invention may further comprise a circuit for transmitting and receiving the multiplexed data through a given communications network.

This enables the provision of portable telephones and portable information terminals capable of decreasing costs and power consumption.

According to the embodiment of the present invention, there is further provided a display control method of driving a display section based on display data for displaying images containing the same image for three or more continuous frames by using a memory which stores display data for at least one frame, and a display controller including a timing generating circuit which generates a given display timing, the method comprising, when writing the display data for each frame, causing the operations for writing display data in one frame into a storage region of the memory corresponding to a scan line to be displayed to precede the operations for reading this display data from the storage region.

In the case where the display data is read from the memory at 60 frames per second (at a frame frequency of 60 Hz), for example, the display data for images containing the same image for three or more continuous frames means display data written into the memory at about 20–25 frames or less per second. Specifically, since the display data must be read at the above frame frequency, the same frame image is read from the display data stored in the memory during two or more continuous frames.

The write operations for the display data may precede the read operations for at least one scan line.

After the display data for the scan line subject to control has been written, the display data for this scan line may be read.

After the write operations for the display data for one frame have been completed based on a given frame synchronization timing, the write operations for the display data may be suspended until the next frame synchronization timing.

The embodiment of the present invention may further provide a display control method for driving a display section based on display data for displaying images containing the same image for three or more continuous frames by using a memory which stores display data for at least one frame, and a display controller including a timing generating circuit which generates a given display timing, the method comprising, when writing display data for each frame, causing the operations for writing display data in one frame into a storage region of the memory corresponding to a scan line to be displayed to precede the operations for reading the display data from the storage region.

The read operations for the display data may precede the write operations for the display data for at least one scan line.

After the display data for the scan line subject to control has been read, the display data for this scan line may be written.

The display data to be written into the memory may be input in synchronization with the display timing generated by the display controller.

The embodiment of the present invention may further provide a display controller (or display driver) for driving a display section based on display data for displaying images containing the same image for three or more continuous frames, comprising a timing generating circuit which generates a given display timing, a memory which stores display data for at least one frame, a first control circuit which controls the read operations for the display data for one scan line stored in the memory based on the display timing in order to drive the display section, and a second control circuit which writes display data for one scan line input asynchronously with the display timing into the memory at a speed equal to or higher than the read speed for the display data stored in the memory while preceding the read operations.

In this display controller, the operations of the second control circuit may precede the read operations for at least one scan line.

After the display data for the scan line subject to control has been written, the display data for this scan line may be read.

After the write operations for the display data for one frame has been completed based on a given frame synchronization timing, the write operations for the display data may be suspended until the next frame synchronization timing.

The embodiment of the present invention may further provide a display controller for driving a display section based on display data for displaying images containing the same image for three or more continuous frames, comprising a timing generating circuit which generates a given display timing, a memory which stores display data for at least one frame, a first control circuit which controls the read operations for the display data for one scan line stored in the memory based on the display timing in order to drive the display section, and a second control circuit which writes display data for one scan line input asynchronously with the display timing into the memory at a speed equal to or higher than the read speed for the display data stored in the memory while preceding the read operations, wherein, when writing the display data for each frame, the operations for writing display data in one frame into a storage region of the memory corresponding to a scan line to be displayed precede the operations for reading this display data from the storage region In this display controller, the operations of the first control circuit may precede the write operations for at least one scan line.

After the display data for the scan line subject to control has been read, the display data for this scan line maybe written.

The display controller may comprise a circuit which outputs the display timing.

The embodiment of the present invention may further provides a display unit which comprises: a panel having an electrooptical element driven by a plurality of first electrodes and second electrodes; anyone of the above described display controllers for driving the plurality of first electrodes; and a scan driver which drives a plurality of second electrodes.

The embodiment of the present invention may further provides an electronic instrument which comprises the above described display unit and a circuit which supplies the display data to the display unit.

An embodiment of the present invention is described below in detail with reference to the drawings.

1. Display Driver

A display driver in the embodiment of the present invention is provided with a built-in display data RAM which stores display data as a frame buffer. The display driver includes an MPEG decoder circuit which decompresses compressed data, in which display data is compressed according to the MPEG-4 standard, and a first-in-first-out memory (hereinafter abbreviated as "FIFO memory") as a buffer for compressed data supplied on a cycle longer than a read cycle for the display data from the display data RAM. The MPEG decoder circuit and the FIFO memory are integrated on a single chip.

1.1 Configuration

FIG. 1 schematically shows a display driver IC with a built-in RAM to which the display driver according to the embodiment of the present invention is applied.

A display driver IC 100 with a built-in RAM in this embodiment includes a display data RAM 102 which stores display data for at least one frame, and an MPEG decoder circuit 106 which decompresses (decodes) compressed data input through an input terminal 104 from outside the IC. The display driver IC 100 with a built-in RAM is controlled by a liquid crystal display (hereinafter abbreviated as "LCD") timing control circuit 108.

A storage region of the display data RAM 102 corresponds to a display region of a liquid crystal panel 110 provided outside the IC as a display section. Therefore, scan lines in the display region are associated with corresponding scan lines in the storage region of the display data RAM 102.

The display driver IC 100 with a built-in RAM includes a built-in liquid crystal driver circuit, and applies a drive voltage corresponding to the display data read from the display data RAM 102 to the liquid crystal panel 110 through a signal electrode 112 as an output terminal for driving the liquid crystal panel 110, according to display timing generated every $1/60$ of a second as a read cycle, for example, by the LCD timing control circuit 108. In this example, the display driver IC 100 is provided with only the signal electrode and is illustrated as an X driver IC for driving signal electrodes. However, the display driver IC 100 may include functions of a Y driver IC for driving scanning electrodes in combination.

The MPEG decoder circuit 106 decodes encoded video data compressed according to the MPEG-4 standard and outputs the decoded data as display data for one frame on a cycle equivalent to the cycle for reading the display data from the display data RAM and driving the display, such as a cycle of $1/60$ of a second.

The MPEG decoder circuit 106 stores decode results for the previous frame in a buffer 114, and decodes the display data in the next frame while appropriately referring to the decode results for the previous frame.

The display driver IC 100 with a built-in RAM in this embodiment includes an FIFO memory 116 for buffering compressed data input on a cycle longer than $1/60$ of a second which is the cycle for reading the display data from the display data RAM 102.

The FIFO memory 116 sequentially stores the compressed data in which the display data is compressed as a bitstream from outside the IC. This bitstream is supplied as bit data of compressed data in which the display data for one frame is compressed every $1/15$ of a second, for example. Therefore, the FIFO memory 116 supplies the compressed data in which the display data for one frame is compressed to the MPEG decoder circuit 106 every $1/15$ of a second, for example.

The MPEG decoder circuit 106 decodes the compressed data supplied from the FIFO memory 116 at timing specified by the LCD timing control circuit 108, and outputs the display data for one frame approximately every $1/60$ of a second.

The display data decompressed by the MPEG decoder circuit 106 is converted into RGB format from YUV format by an RGB conversion circuit 118. The display data in RGB format is written into the storage region of the display data RAM 102 corresponding to the display region on a cycle equivalent to the cycle for reading the display data from the display data RAM and driving the display, such as a $1/60$-second cycle.

Specifically, the output from the MPEG decoder circuit 106 is written as display data in the new frame in synchronization with the read cycle from the display data RAM 102.

1.2 Operation Timing

Figure 2:
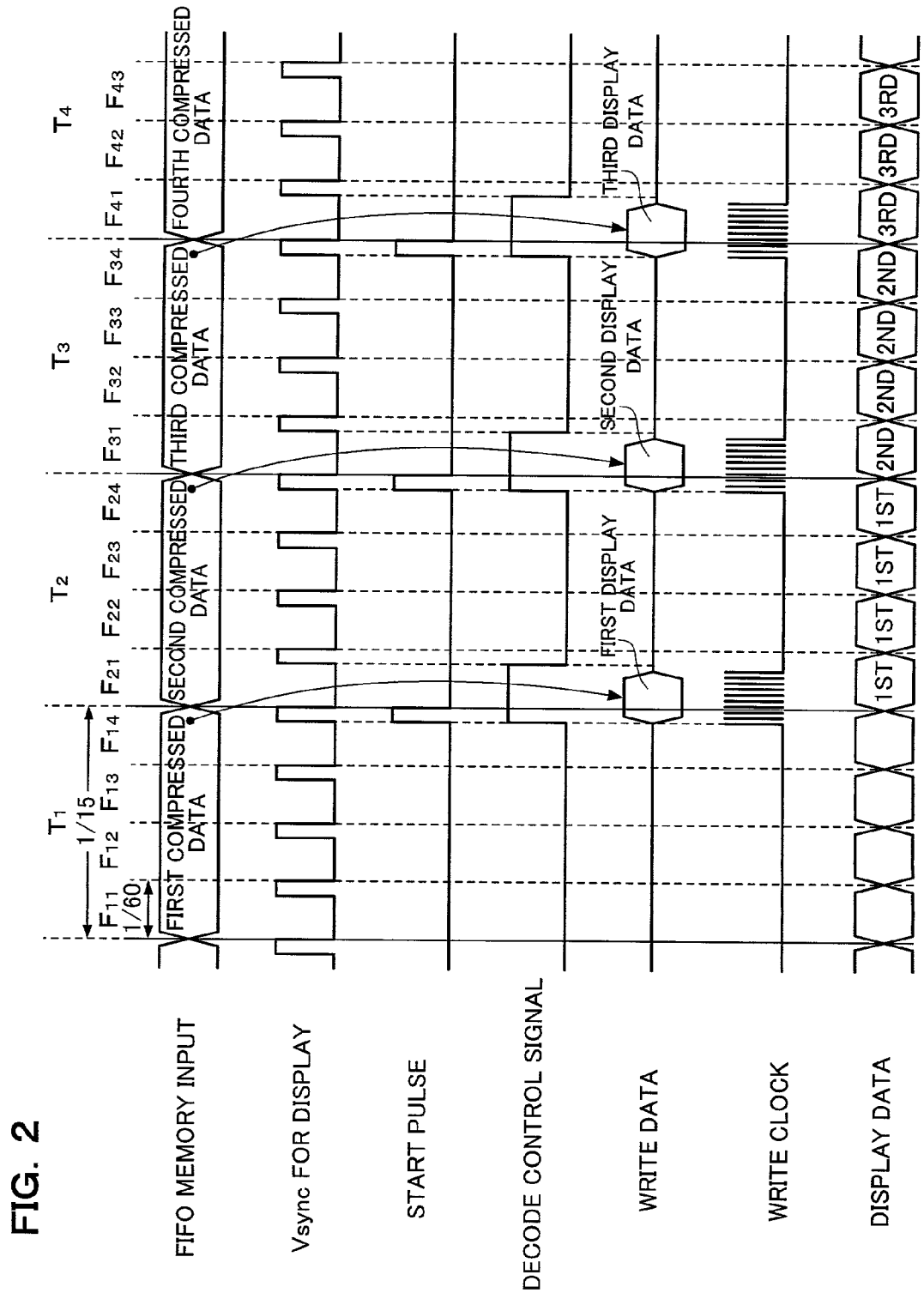
FIG. 2 is a timing chart showing an example of the operation timing for the display driver IC with a built-in RAM.

FIG. 2 shows an example of the operation timing for the display driver IC with a built-in RAM in this embodiment.

FIG. 2 illustrates the operation timing in units of $1/60$ of a second in which the display data is read from the display data RAM 102 for driving the display.

Bitstreams are sequentially input to the FIFO memory 116 from the outside within $1/15$ of a second in a cycle $T_1$, whereby the compressed data in which the display data for one frame is compressed is completed. The FIFO memory 116 outputs the compressed data to the MPEG decoder circuit 106.

The LCD timing control circuit 108 generates a display Vsync which is a vertical synchronization signal for display in units of $1/60$ of a second. The display data for one frame is read from the display data RAM 102 in synchronization with the display Vsync, and the liquid crystal panel 110 is driven by the liquid crystal driver circuit (not shown).

The LCD timing control circuit 108 supplies a start pulse on a cycle of $1/15$ of a second to the MPEG decoder circuit 106 based on the display Vsync. The compressed data is sequentially supplied to the MPEG decoder circuit 106 from the FIFO memory 116 in synchronization with the start pulse.

The LCD timing control circuit 108 supplies a decode control signal of which the logic level rises to "H" during a period from the leading edge of the start pulse to the next leading edge of the display Vsync.

The MPEG decoder circuit 106 starts to decode the compressed data supplied from the FIFO memory 116 using the start pulse supplied from the LCD timing control circuit 108 as a trigger.

The MPEG decoder circuit 106 decodes the compressed data in synchronization with a given operation clock. The operation clock is mask-controlled by the decode control signal.

Specifically, in the case where the logic level of the decode control signal supplied from the LCD timing control circuit 108 is "H", the MPEG decoder circuit 106 decompresses the compressed data since the operation clock is not masked. In the case where the logic level of the decode control signal is "L", the operation clock is masked and the operation clock is suspended, whereby the decompression operations are suspended.

Since this causes the compressed data subject to decompression to be supplied only every 1/15 of a second, there is no need to allow the MPEG decoder circuit 106 to perform decode operations during the remaining period of time. Therefore, the operations of the MPEG decoder circuit 106 are suspended during a period after the decompression operations of about 1/60 of a second, thereby enabling the power consumption to be decreased.

The MPEG decoder circuit 106 starts to decode using the start pulse as a trigger. The MPEG decoder circuit 106 causes the decode results to be sequentially converted by the RGB conversion circuit 118, and writes the converted data into the display data RAM 102.

The LCD timing control circuit 108 generates a write clock for writing the decoded display data into the display data RAM 102. The LCD timing control circuit 108 may generate a write clock corresponding to predetermined decode output timing in order to control the MPEG decoder circuit 106 to start to decode.

The write clock is generated by the LCD timing control circuit 108 so that the write clock is started slightly earlier than the read clock for display data from the display data RAM 102 generated every 1/60 of a second, and the write operations for the display data are completed earlier than the read operations for the display data.

Figure 3:
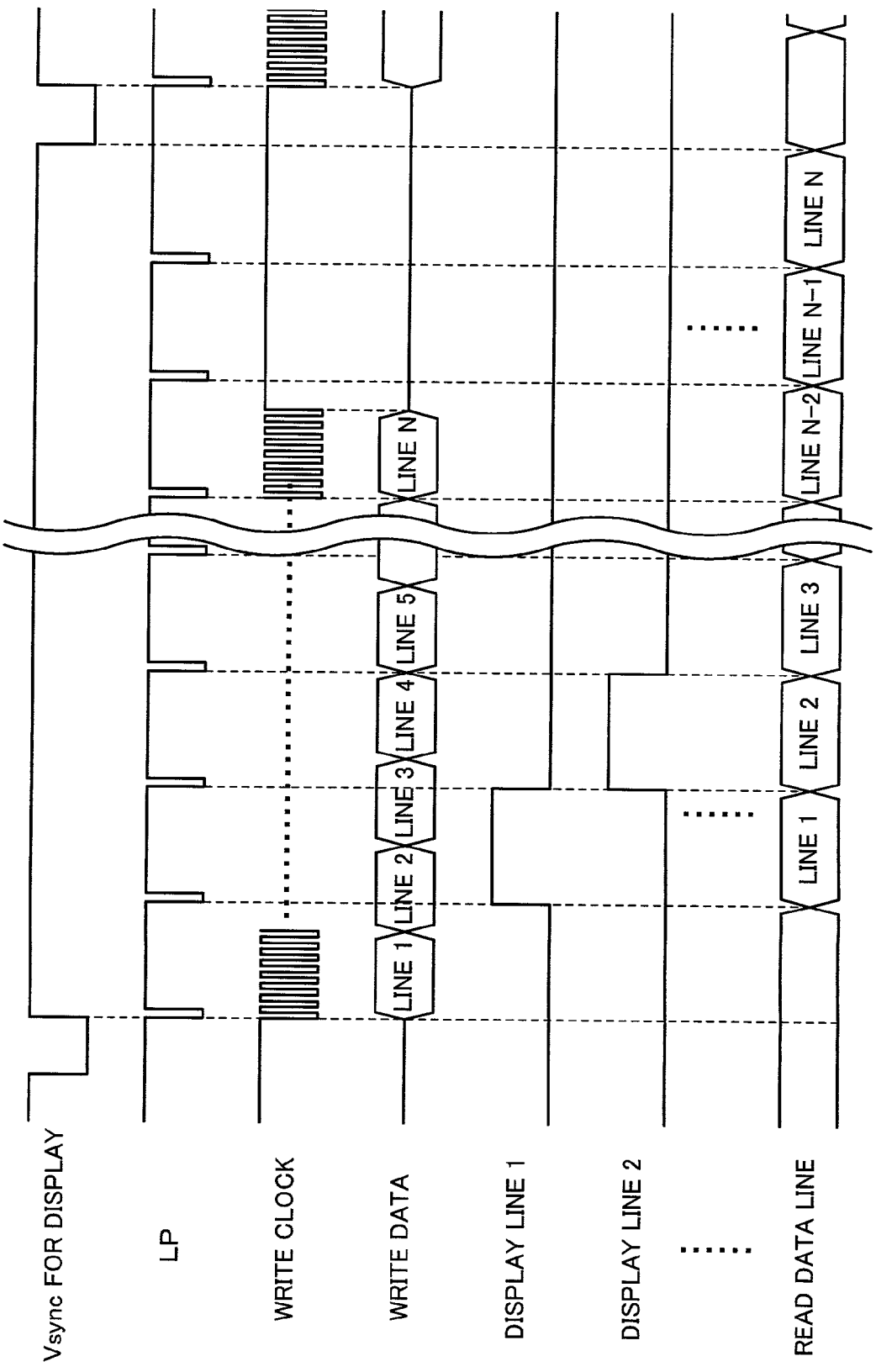
FIG. 3 is a timing chart showing an example of the write timing and the read timing for a display data RAM of the display driver IC with a built-in RAM.

FIG. 3 shows an example of the write timing and the read timing for a display data RAM 102 of the display driver IC 100 with a built-in RAM according to this embodiment.

The LCD timing control circuit 108 starts to output the write clock based on the edge of the display Vsync generated in frame units based on oscillation output of an oscillation circuit generated therein. The write clock causes the display data for one frame to be sequentially written for every scan line into the storage region of the display data RAM 102 corresponding to the display region.

A scanning latch pulse LP is output based on the edge of the display Vsync. The display data is sequentially read from the storage region of display data RAM 102 corresponding to the display region in synchronization with a second latch pulse LP which is delayed for one scan line from the display Vsync as a frame synchronization signal. Specifically, the write operations are allowed to precede the read operations for one scan line.

In the case where the size of the storage region of the display data RAM 102 corresponding to the display region is N scan lines, for example, the logic level of the write clock is set to "H" after write operations for the scan line N are completed, whereby the operations of the write clock are suspended.

The write operations for the display data into the display data RAM 102 is performed thereafter so that the display data RAM 102 is accessed for every frame while maintaining the above relation between the write timing and the read timing.

As a result, the display data for the scan line for which the write operations have been completed is sequentially read.

For example, first compressed data in which the display data for one frame is compressed from the bitstreams input between frames $F_{11}$–$F_{14}$ in the cycle $T_1$ is decoded by the MPEG decoder circuit 106 using the start pulse at a frame $F_{21}$ as a trigger as shown FIG. 2, and converted into first display data as uncompressed data after RGB conversion.

The LCD timing control circuit 108 generates the write clock shown in FIG. 3 in synchronization with the start pulse at the frame $F_{21}$, and sequentially writes the first display data into the display data RAM 102.

The LCD timing control circuit 108 reads the display data stored in the display data RAM 102 based on the edge of the display Vsync generated every 1/60 of a second in frame units based on the oscillation output of the oscillation circuit generated therein, and drives the liquid crystal panel 110.

As a result, the liquid crystal panel 110 is continuously driven based on the first display data between frames $F_{21}$–$F_{24}$ in a cycle $T_2$.

The display driver IC 100 with a built-in RAM according to this embodiment continuously drives the liquid crystal panel 110 according to the second display data from frames $F_{31}$ to $F_{34}$ in a cycle $T_3$, based on second compressed data in which the second display data for one frame is compressed from the bitstreams input from a frame $F_{21}$ to a frame $F_{24}$ in the cycle $T_2$, as shown in FIG. 2.

The display driver IC 100 with a built-in RAM in this embodiment generates the display data produced by decompressing the compressed data supplied on a cycle longer than the read cycle for the built-in display data RAM 102 through the built-in MPEG decoder circuit 106 on a cycle approximately the same as the read cycle for the built-in display data RAM 102.

This enables the read timing and the write timing for the display data RAM 102 to be synchronized, whereby occurrence of a state in which the display data in both the old and new frames is present in the display data RAM 102 can be significantly decreased by controlling these timings.

The display data is written into the display data RAM 102 so that the write operations for the display data precede the read operations for the display data from the display data RAM 102 and are completed earlier, thereby preventing the display data in both the old and new frames from being present in the display data RAM 102. As a result, even if the display data is read from the display data RAM 102 every 1/60 of a second taking into consideration the human visual characteristics, a problem in which the sense of incongruity occurs relating to the connection between two continuous frames is eliminated, whereby moving images excelling in visibility can be displayed.

1.3 Comparative Example

The display driver IC 100 with a built-in RAM as shown in FIG. 1 is described below while referring to the following comparative example.

Figure 4:
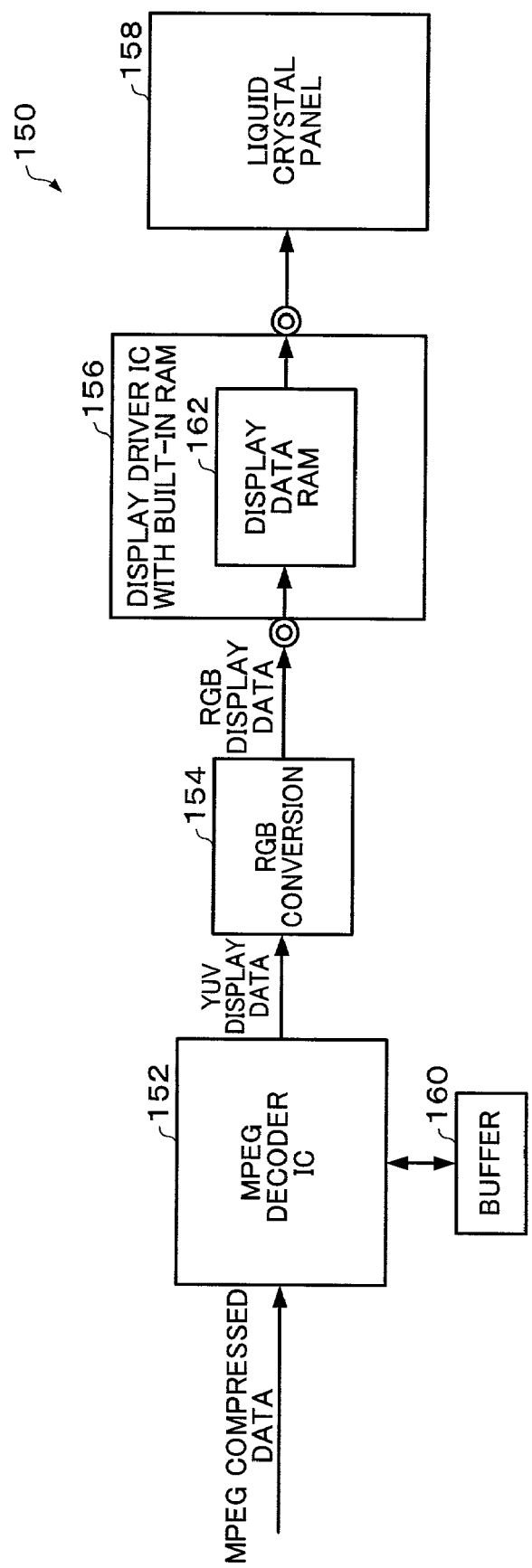
FIG. 4 is a block diagram of a comparative example showing an electronic instrument to which an MPEG-4 decoder IC is applied to drive a display section.

FIG. 4 shows an outline of the configuration of an electronic instrument in which a display section is driven by applying an MPEG-4 decoder IC.

An electronic instrument 150 includes an MPEG decoder IC (semiconductor device in a broad sense) 152, an RGB conversion circuit 154, a display driver IC 156 with a built-in RAM, and a liquid crystal panel 158.

In this example, MPEG compressed data which is encoded video data for display is demultiplexed by a multiplexer/demultiplexer circuit (not shown) included in the electronic instrument 150 from multiplexed data in which various types of MPEG-4 encoded data are multiplexed, and supplied to the MPEG decoder IC 152.

The MPEG decoder IC 152 is a single-chip IC including decoder circuits for various types of encoded data such as MPEG-4 encoded video data and encoded audio data.

The MPEG decoder IC 152 decodes demultiplexed MPEG compressed data according to the MPEG-4 standard. The MPEG decoder IC 152 stores the decode results for the previous frame in a buffer 160 provided either inside or outside the MPEG decoder IC 152, and sequentially decodes the display data in the next frame while appropriately referring to the decode results for the previous frame.

The RGB conversion circuit 154 converts the display data in YUV format, which is uncompressed data decoded by the MPEG decoder IC 152, into display data in RGB format, and supplies the display data to the display driver IC 156 with a built-in RAM.

The display driver IC 156 with a built-in RAM includes a display data RAM 162 having a storage region corresponding to the display region of the liquid crystal panel 158. The display driver IC 156 with a built-in RAM reads the display data for one frame from the display data RAM 162 at read timing generated by a built-in LCD timing control circuit (not shown) such as a cycle of 1/60 of a second, and drives the liquid crystal panel 158.

The cycle in which the display driver IC 156 with a built-in RAM reads the display data from the built-in RAM is set at a value taking into consideration the human visual characteristics. Therefore, in the case where sufficient data transfer cannot be performed due to a limited communication speed whereby display data cannot be written into the display data RAM 162 on the read cycle (approximately 1/60 of a second) due to decompression operations such as in the case of MPEG-4 compressed data, the same image is continuously read during two or more frames.

In the configuration shown in FIG. 4, the decoded display data is connected to each IC through a bus outside the IC. Therefore, current is consumed in driving a large amount of decoded data transmitted through the bus outside the IC, thereby increasing the power consumption.

In particular, in the case of applying a general-purpose single chip IC as the MPEG-4 decoder circuits in the mobile applications, such a single chip IC is generally over specification, thereby increasing the size, costs, and power consumption of the equipment. This makes it difficult to provide an electronic instrument with optimum configuration meeting user needs. Therefore, it is preferable to provide only the most suitable decoder circuits for each piece of media information which makes up multimedia information.

On the contrary, since the display driver IC 100 with a built-in RAM of this embodiment as shown in FIG. 1 includes the built-in MPEG decoder circuit, only encoded compressed data is transmitted through the bus connecting each IC. This limits the amount of data to one fourth to one/several tenths as large as that of the decoded data, thereby significantly decreasing the amount of current consumed by driving a large amount of decoded data.

Moreover, even if the multiplexed data in which encoded data corresponding to various types of media is input, it suffices to provide only a decoder circuit according to the standard suitable for the liquid crystal panel 110, for example, without changing the sections in the equipment corresponding to other media. This ensures that an electronic instrument with optimum configuration can be provided.

1.4 Application to Display Unit

Figure 5:
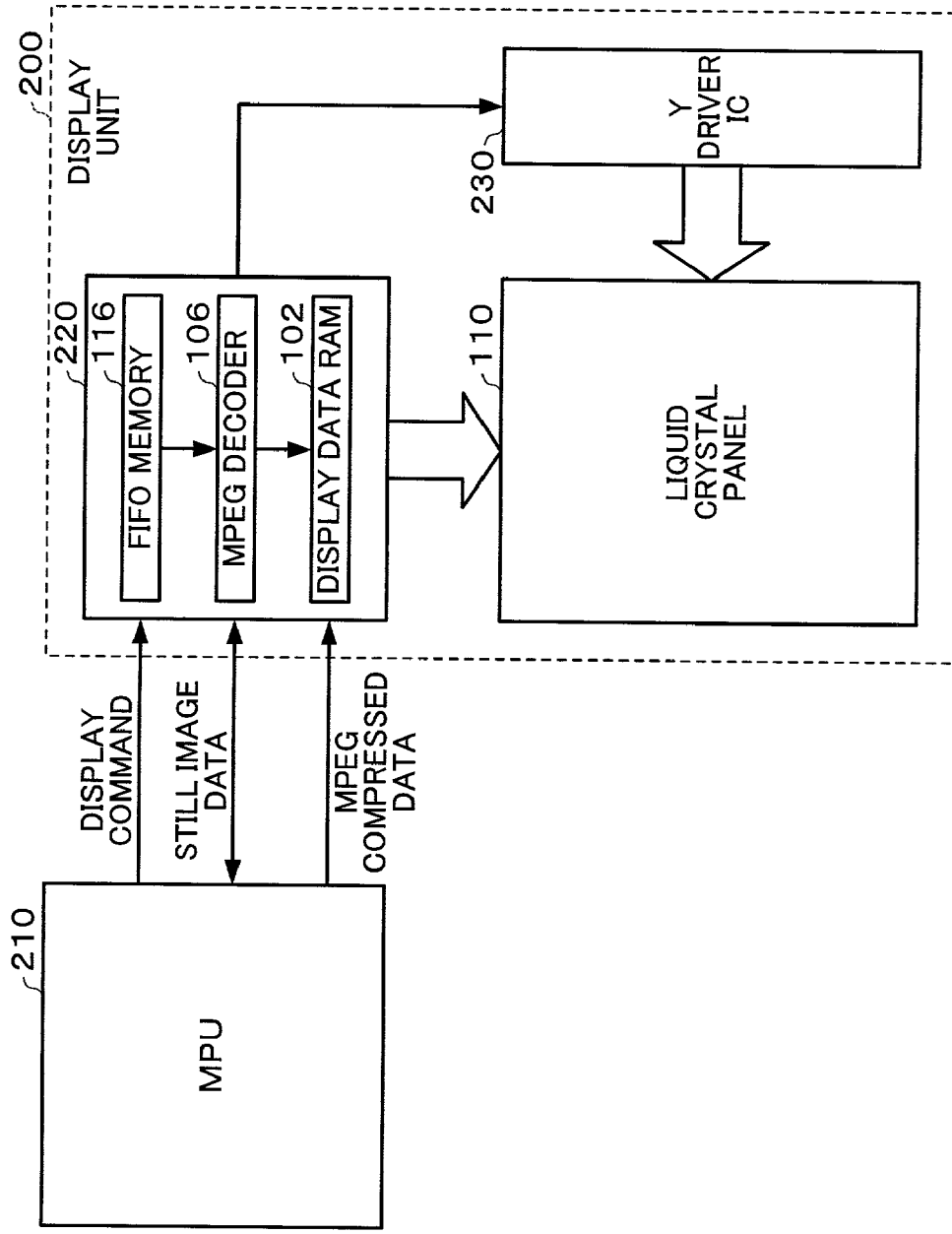
FIG. 5 is a block diagram showing an example of the display unit according to the embodiment of the present invention.

FIG. 5 shows an example of a display unit to which the display driver IC 100 with a built-in RAM is applied as an X driver IC.

A display unit 200 displays still image data generated by an MPU (micro processor unit) 210 or images corresponding to MPEG compressed data in the liquid crystal panel 110.

The MPU 210 demultiplexes encoded video data from multiplexed data, in which MPEG-4 encoded data for each medium is multiplexed, received through a communications network such as a mobile communications network, and supplies the encoded video data to the display unit 200 as MPEG compressed data.

The MPU 210 generates still image data such as text data and supplies the data to the display unit 200.

The display unit 200 includes the liquid crystal panel 110, a display driver IC 220 with a built-in RAM for driving signal electrodes of the liquid crystal panel 110 which has the same configuration as the display driver IC 100 with a built-in RAM shown in FIG. 1, and a Y driver IC 230 for driving scanning electrodes.

The liquid crystal panel 110 is a matrix panel having an electrooptical element, for example, in which an electrooptical element such as a liquid crystal of which the optical characteristics are changed by applying a voltage is used. A simple matrix panel may make up the liquid crystal panel 110, for example. In this case, a liquid crystal is sealed between a first substrate on which a plurality of segment electrodes (first electrodes) is formed and a second substrate on which a plurality of common electrodes (second electrodes) is formed. The liquid crystal panel 110 may be an active matrix panel using a three terminal device such as a thin film transistor (TFT) or a thin film diode (TFD) or a two terminal device. The active matrix panel includes a plurality of signal electrodes (first electrodes) driven by the display driver IC 220 with a built-in RAM, and a plurality of scanning electrodes (second electrodes) driven by the Y driver IC 230 for driving scanning electrodes.

The liquid crystal panel 110 is capable of displaying a still image and a moving image at the same time. In this case, a moving image display region specified by the image size of the moving image data supplied by the MPU 210, and a still image display region (text data display region) are set in the liquid crystal panel 110 by display commands from the MPU 210.

The display driver IC 220 with a built-in RAM includes a control circuit for the Y driver IC 230 for driving scanning electrodes. The control circuit instructs the Y driver IC 230 as to scan timing and directly writes the still image data into the storage region of the display data RAM 102 corresponding to the still image display region instructed by the display commands from the MPU 210.

1.5 Another Example of the Display Driver

The configuration of the RAM built-in display driver IC capable of eliminating the sense of incongruity relating to the connection between two continuous frames even if the display data is read from the display data RAM 102 every 1/60 of a second taking into consideration the human visual characteristics is not limited to the configuration shown in FIG. 1.

Figure 6:
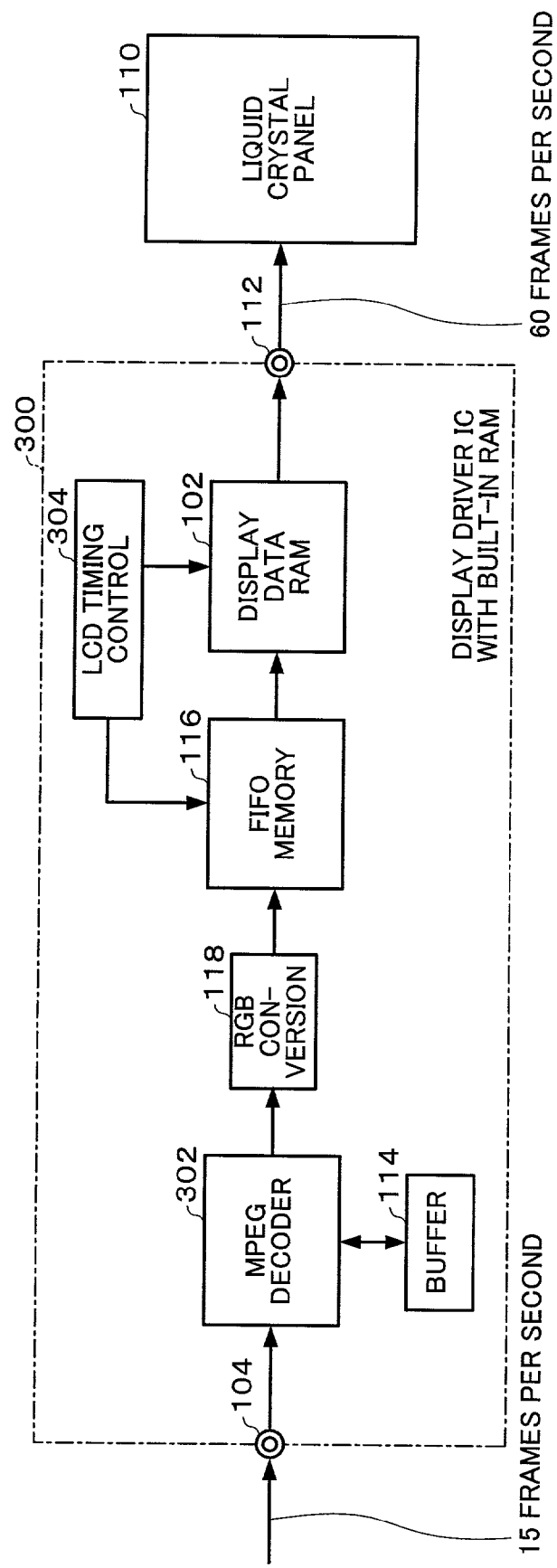
FIG. 6 is a block diagram showing another example of a display driver IC with a built-in RAM according to the embodiment of the present invention.

FIG. 6 shows another example of the display driver IC with a built-in RAM according to the embodiment of the present invention.

Sections the same as those of the display driver IC 100 with a built-in RAM shown in FIG. 1 are indicated by the same symbols. Description of these sections is appropriately omitted.

A display driver IC 300 with a built-in RAM includes the display data RAM 102 and an MPEG decoder circuit 302, and is controlled by an LCD timing control circuit 304.

The display driver IC 300 with a built-in RAM includes a built-in liquid crystal driver circuit, and applies a drive voltage corresponding to the display data read from the display data RAM 102 to the liquid crystal panel 110 through the signal electrode 112 as an output terminal for driving the liquid crystal panel 110, according to display timing generated by the LCD timing control circuit 304 every $1/60$ of a second as the read cycle, for example. In this example, the display driver IC 100 includes only the signal electrode, and is illustrated as an X driver IC for driving signal electrodes. However, the display driver IC 100 may include functions of a Y driver IC for driving scanning electrodes.

The MPEG decoder circuit 302 decodes encoded video data compressed according to the MPEG-4 standard and outputs the decoded data as display data for one frame.

The MPEG decoder circuit 302 stores the decode results for the previous frame in the buffer 114, and sequentially decodes the display data in the next frame while appropriately referring to the decode results for the previous frame.

Since multiplexed data, in which compressed data according to the MPEG-4 standard for each medium is multiplexed, is generally supplied every $1/15$ of a second, the MPEG decoder circuit 302 decodes and outputs the display data in units of approximately $1/15$ of a second.

The FIFO memory 116 sequentially stores the display data in RGB format converted from the decode output by the RGB conversion circuit 118. The stored display data is output every $1/60$ of a second on instructions from the LCD timing control circuit 304, and written into the display data RAM 102.

In this case, the write operations for the display data also precede the read operations for the display data for at least one scan line as shown in FIG. 3, and the write speed for one scan line is higher than the read speed for one scan line.

The display driver IC with a built-in RAM 300 having the above configuration can also be applied to the display unit shown in FIG. 5.

Figure 7A:
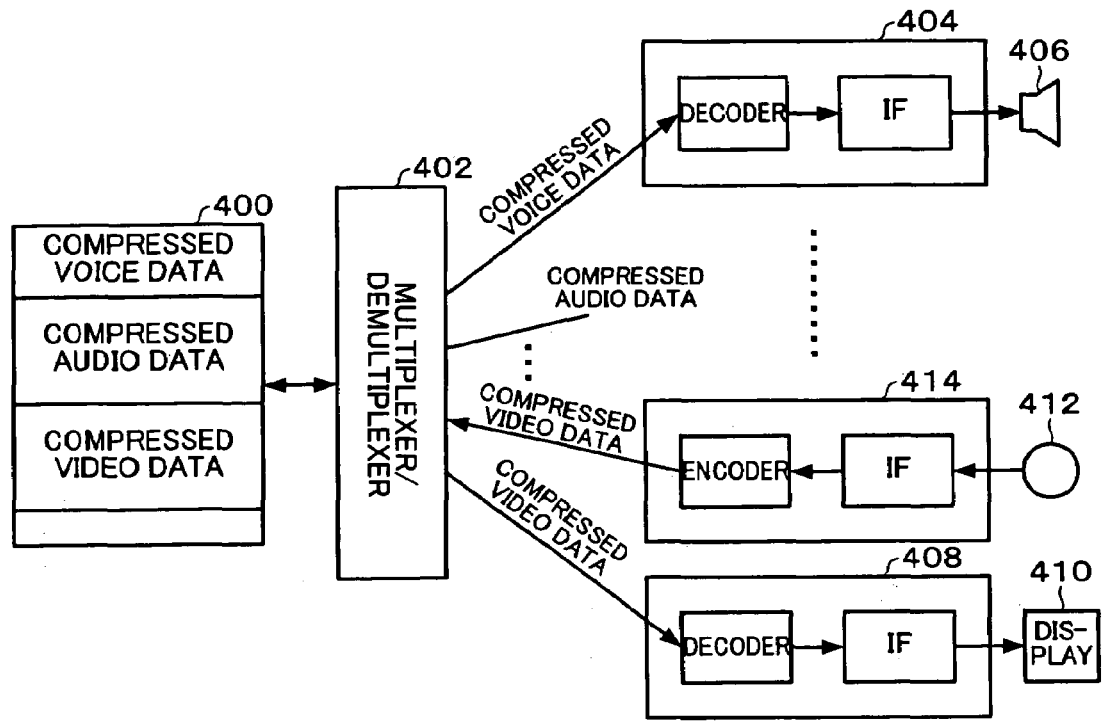
FIG. 7A shows a concept of the multiplexing/demultiplexing of multiplexed data in the embodiment of the present invention.
Figure 7B:
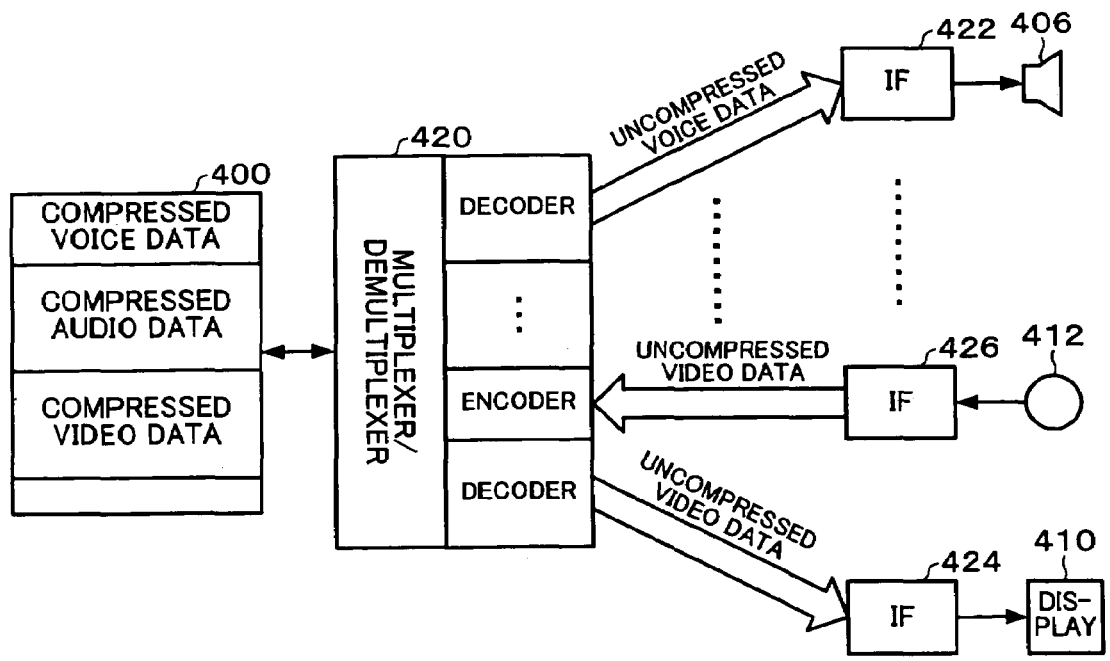
FIG. 7B shows a concept of the conventional multiplexing/demultiplexing of multiplexed data.

2. Configuration of an Electronic Instrument According to the Embodiment of the Present Invention FIG. 7A shows a concept of multiplexing/demultiplexing of multiplexed data according to the present invention. FIG. 7B shows a concept of multiplexing/demultiplexing of multiplexed data according to the conventional art.

In this embodiment, multiplexed data 400 in which voice (sound) data, audio data, and video data compressed by a given compression standard are multiplexed is demultiplexed into compressed voice (sound) data, compressed audio data, and compressed video data by a multiplexer/demultiplexer circuit 402, as shown in FIG. 7A.

For example, the demultiplexed compressed voice data is decoded in a sound output interface section 404 according to a given compression standard, and output to a speaker 406 through an IF circuit. The demultiplexed compressed video data is decoded in an image output interface section 408 according to the MPEG-4 standard, for example, and output to a display section 410 through an IF circuit.

A video signal input from a camera 412 is encoded in an image input interface section 414 by an encoder through an IF circuit according to the MPEG-4 standard, for example, and supplied to the multiplexer/demultiplexer circuit 402.

The multiplexer/demultiplexer circuit 402 multiplexes the compressed video data input from the image input interface section 414 to generate the multiplexed data 400.

In the conventional art, the multiplexed data 400 in which voice data, audio data, and video data compressed by a given compression standard are multiplexed is input to a compression/decompression circuit 420 including a multiplexer/demultiplexer circuit and decoders and encoders for each compressed data, as shown in FIG. 7B.

The multiplexer/demultiplexer circuit of the compression/decompression circuit 420 demultiplexes compressed voice data, compressed audio data, and compressed video data from the multiplexed data 400.

The demultiplexed compressed voice data is decoded by the decoder of the compression/decompression circuit 420 according to a given compression standard, transmitted to an IF circuit 422, and output to the speaker 406, for example. The demultiplexed compressed video data is decoded by the decoder of the compression/decompression circuit 420 according to the MPEG-4 standard, for example, transmitted to an IF circuit 424, and output to the display section 410.

A video signal input from the camera 412 is transmitted to the compression/decompression circuit 420 through an IF circuit 426, and encoded by the encoder of the compression/decompression circuit 420 according to the MPEG-4 standard, for example.

The encoded compressed video data is multiplexed by the multiplexer/demultiplexer circuit of the compression/decompression circuit 420, whereby the multiplexed data 400 is generated.

As described above, a general-purpose or over specification compression/decompression circuit including built-in decoders or encoders is provided in a conventional example as shown in FIG. 7B. Moreover, uncompressed data is transmitted to each IF circuit. In this embodiment, since the compressed data containing a smaller amount of data is transmitted to each interface section as shown in FIG. 7A, the amount of current consumed in driving the bus can be decreased.

Moreover, since a decoder or an encoder according to a standard meeting the requirements of the input-output devices such as the speaker 406, the camera 412, and the display section 410 can be provided in each interface section, the device configuration can be optimized.

The configuration of the above electronic instrument is described below in more detail.

2.1 First Example

Figure 8:
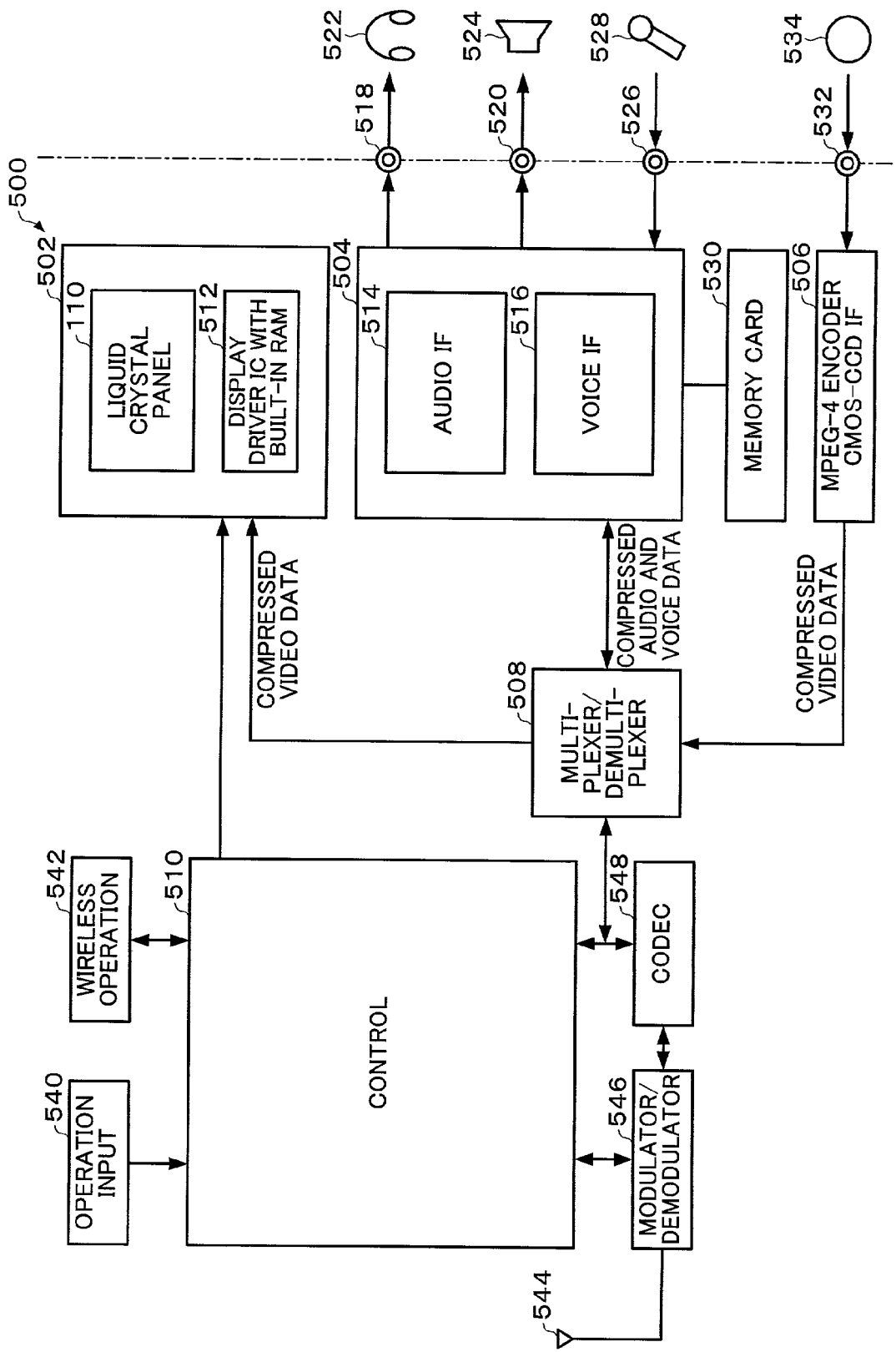
FIG. 8 is a block diagram showing a first example of an electronic instrument to which a display driver IC with a built-in RAM according to the embodiment of the present invention is applied.

FIG. 8 shows a first example of an electronic instrument to which the display driver IC with a built-in RAM according to the embodiment of the present invention is applied.

An electronic instrument 500 includes a display unit 502, a sound processing IC 504, a CMOS-CCD interface circuit 506, a multiplexer/demultiplexer circuit 508, and a control circuit 510.

The display unit 502 includes a matrix panel having an electrooptical element such as the color liquid crystal panel (display section in a broad sense) 110, and a display driver IC 512 with a built-in RAM shown in FIG. 1 or 6.

The liquid crystal panel 110 is capable of displaying still images and moving images at the same time, as described for FIG. 5. In this case, a moving image display region specified by the image size of moving image data and a still image display region (text data display region) are set in the display region of the liquid crystal panel 110. Display data for one frame is read from a display data RAM included in the display driver IC 512 with a built-in MPEG-4 decoder every 1/60 of a second, for example, whereby moving and still images are displayed.

The display driver IC 512 with a built-in RAM includes a display data RAM which stores display data for at least one frame. The display driver IC 512 decompresses the compressed video data supplied from the multiplexer/demultiplexer circuit 508 according to the MPEG-4 standard, and stores the decompressed data in the display data RAM as moving image data or still image data. The control circuit 510 causes the display driver IC 512 with a built-in RAM to supply text data as the display data or to set the moving image display region and the still image display region.

The sound processing IC 504 includes an audio interface circuit 514 and a voice interface circuit 516.

More specifically, the audio interface circuit 514 generates uncompressed data by decoding MPEG-4 compressed audio data or MP3 (MPeg audio layer 3) compressed audio data supplied from the multiplexer/demultiplexer circuit 508. The audio interface circuit 514 converts the uncompressed data into an analog signal by D/A conversion, and outputs the audio signal to a headphone 522 or a speaker 524 connected through output terminals 518 and 520, for example.

The voice interface circuit 516 generates uncompressed data by decoding compressed voice data using "Global System for Mobile communication-Adaptive Multi-Rate coding" (GSM-AMR) or "Transform domain Weighted INterleave Vector Quantization" (TwinvQ). The voice interface circuit 516 converts the uncompressed data into an analog signal by D/A conversion, and outputs the voice signal to the speaker 524 through an output terminal 520, for example. The voice interface circuit 516 converts a voice signal input from a microphone 528 through an input terminal 526 into a digital signal by A/D conversion. The voice interface circuit 516 generates compressed data by encoding the digital signal into compressed voice data using GSM-ARM or TwinVQ, and outputs the compressed data to the multiplexer/demultiplexer circuit 508.

The sound processing IC 504 may be designed so that a removable memory card 530 is connected to the electronic instrument 500, and the compressed voice data using GSM-ARM or TwinVQ is stored in the memory card 530. As the memory card 530, memory cards according to various standards can be applied.

The MPEG-4 encoder CMOS-CCD(Charge Coupled Device) interface circuit 506 generates compressed video data by encoding a video signal input from a CMOS-CCD camera 534 through an input terminal 532 according to the MPEG-4 video standard, and outputs the compressed video data to the multiplexer/demultiplexer circuit 508.

The multiplexer/demultiplexer circuit 508 demultiplexes compressed video data in which display data for the display unit 502 is compressed and compressed audio data or compressed voice data to be supplied to the sound processing IC 504, from the multiplexed compressed data in which compressed data corresponding to each medium is multiplexed. The multiplexer/demultiplexer circuit 508 generates multiplexed compressed data by multiplexing the compressed video data compressed by the MPEG-4 encoder CMOS-CCD interface circuit 506 and audio data or voice data compressed by the sound processing IC 504.

The electronic instrument 500 is capable of transmitting or receiving the multiplexed compressed data input to or output from the multiplexer/demultiplexer circuit 508 through a wireless communications network such as a mobile communications network, as the same functions as the communication functions of portable telephones.

Therefore, the electronic instrument 500 includes an operation input section 540 to which operation information is input by keying, and a wireless operation section 542 for performing wireless operations by Bluetooth which is short distance wireless communications technology, and the like. These sections are controlled by the control circuit 510.

The control circuit 510 includes a CPU and a memory (not shown) so that a series of transmission and reception operations can be performed through a wireless communications network according to a control program stored in the memory. Operation information necessary for data transmission and reception by the electronic instrument 500 is input through the operation input section 540.

The electronic instrument 500 includes a modulator/demodulator circuit 546 which demodulates a signal received through an antenna 544, or modulates a signal to be transmitted through the antenna 544. Video data encoded according to the MPEG-4 standard, for example, can be transmitted or received through the antenna 544.

A signal input through the antenna 544 is demodulated through the modulator/demodulator circuit 546 and decoded by a codec circuit 548. As a result, multiplexed compressed data to be supplied to the multiplexer/demultiplexer circuit 508 or received data to be processed by the control circuit 510 is generated, for example.

Data transmitted through the modulator/demodulator circuit 546 and the antenna 544 is transmission data from the control circuit 510 or multiplexed compressed data from the multiplexer/demultiplexer circuit 508 encoded by the codec circuit 548.

As described above, the control circuit 510 performs data transmission and reception operations according to instructions input through the operation input section 540 or the wireless operation section 542, by controlling the modulator/demodulator circuit 546 and the codec circuit 548 based on the control program. For example, the control circuit 510 outputs text data to the display unit 502 or sets the display region of the display unit 502 based on the data received from the codec circuit 548, or outputs transmission data generated according to instructions from the operation input section 540 or the like to the codec circuit 548, and allows the data to be transmitted through the antenna 544.

In the electronic instrument 500 having the above configuration, in the case where the received data in which a signal received by the antenna 544 through a wireless communications network is decoded by the codec circuit 548 is the multiplexed compressed data, the multiplexer/demultiplexer circuit 508 demultiplexes the received data into compressed data corresponding to each medium as bitstream data, and supplies the data to the corresponding output interface ICs.

For example, the display driver IC with a built-in RAM 512 as an input interface IC decodes the compressed video data demultiplexed by the multiplexer/demultiplexer circuit 508 every 1/15 of a second using the FIFO memory as shown in FIG. 1 or 6, and writes the decoded data into the display data RAM so that the write operations performed at a higher speed precede the read operations. This prevents the display data in the old and new frames read every 1/60 of a second from being present in the built-in display data RAM.

Compressed data encoded by the input interface IC is multiplexed by the multiplexer/demultiplexer circuit 508. The multiplexed compressed data is encoded by the codec circuit 548, and transmitted to the wireless communications network through the antenna 544 according to instructions from the operation input section 540, for example.

Therefore, in the case where the signal received through the wireless communications network is the multiplexed compressed data, the multiplexed compressed data is demultiplexed in a compressed state according to the MPEG-4 standard, for example, and transmitted to the interface ICs for the display section or each input-output device. Specifically, each IC inside the equipment can be connected in a state in which the amount of data to be transmitted is decreased, whereby the amount of current consumed in driving the bus can be significantly decreased.

In particular, since each interface IC includes a decoder circuit and an encoder circuit according to the MPEG-4 standard, the number of busses through which uncompressed data corresponding to each medium is transmitted can be decreased, whereby the power consumption can be decreased effectively.

Moreover, allowing each interface IC to include a decoder circuit or an encoder circuit enables applying a decoder circuit or an encoder circuit corresponding to the MPEG-4 profile for the input-output devices to be connected, whereby miniaturization of the equipment and optimization of the configuration can be easily achieved.

2.2 Second Example

Figure 9:
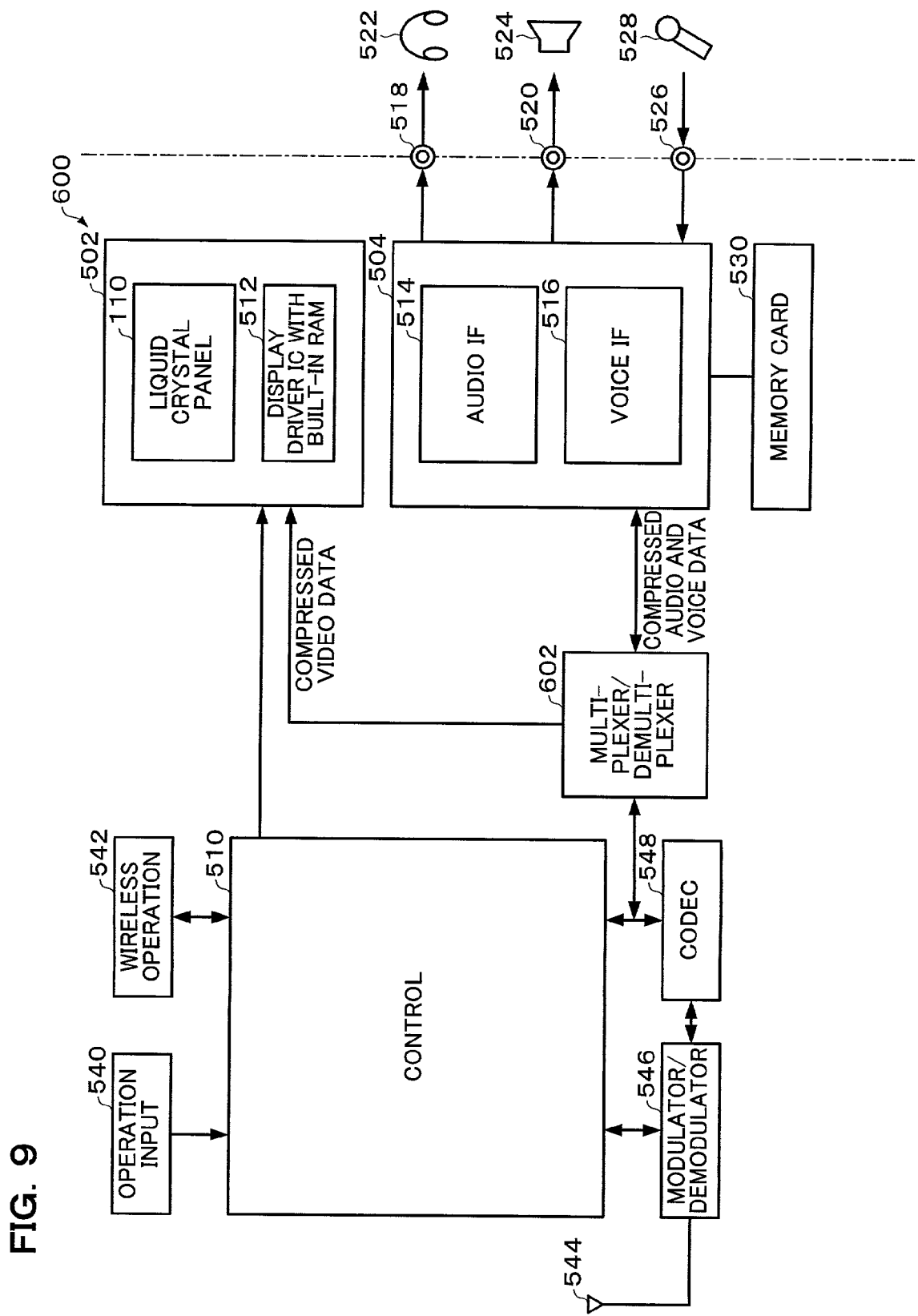
FIG. 9 is a block diagram showing a second example of an electronic instrument to which a display driver IC with a built-in RAM according to the embodiment of the present invention is applied.

FIG. 9 shows a second example of an electronic instrument to which the display driver IC with a built-in RAM according to the embodiment of the present invention is applied.

Sections the same as those of the electronic instrument of the first example shown in FIG. 8 are indicated by the same symbols. Description of these sections is appropriately omitted.

An electronic instrument 600 of the second example includes the display unit 502, the sound processing IC 504, a multiplexer/demultiplexer circuit 602, and the control circuit 510.

The difference between the electronic instrument 600 and the electronic instrument 500 of the first example is that the CMOS-CCD camera interface circuit 506 and the input terminal 532 corresponding thereto are not provided.

Therefore, the multiplexer/demultiplexer circuit 602 of the second example demultiplexes compressed video data in which display data for the display unit 502 is compressed and compressed audio data or compressed voice data to be output from the sound processing IC 504, from multiplexed compressed data in which compressed data corresponding to each medium is multiplexed. The multiplexer/demultiplexer circuit 602 generates multiplexed compressed data by multiplexing audio data or voice data compressed by the sound processing IC 504.

According to the electronic instrument 600 having the above configuration, in the case where the signal received through a wireless communications network is a bitstream which is the multiplexed compressed data, the bitstream is demultiplexed in a compressed state according to the MPEG-4 standard, for example, and transmitted to the interface ICs for the display section or each input-output device. This significantly decreases the amount of current consumed in driving the bus.

In particular, since each interface IC includes a decoder circuit and an encoder circuit according to the MPEG-4 standard, the number of busses through which uncompressed data corresponding to each medium is transmitted can be decreased, whereby the power consumption can be decreased effectively.

Moreover, allowing each interface IC to include a decoder circuit or an encoder circuit enables applying a decoder circuit or an encoder circuit corresponding to the MPEG-4 profile for the input-output devices to be connected, whereby miniaturization of the equipment and optimization of the configuration can be easily achieved.

2.3 Third Example

Figure 10:
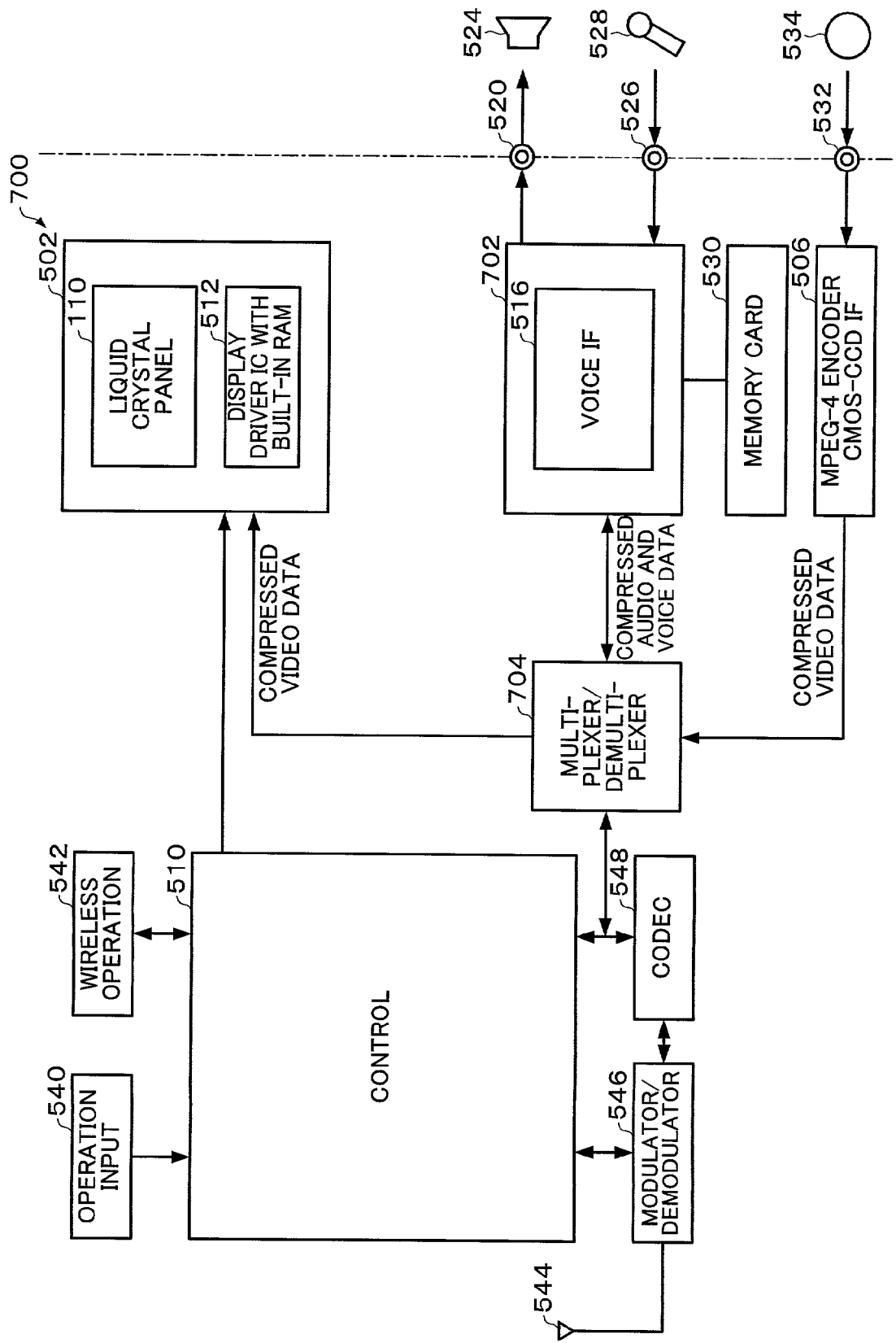
FIG. 10 is a block diagram showing a third example of an electronic instrument to which a display driver IC with a built-in RAM according to the embodiment of the present invention is applied.

FIG. 10 shows a third example of an electronic instrument to which the display driver IC with a built-in RAM according to the embodiment of the present invention is applied.

Sections the same as those of the electronic instrument of the first example shown in FIG. 8 are indicated by the same symbols. Description of these sections is appropriately omitted.

An electronic instrument 700 includes the display unit 502, a sound processing IC 702, the CMOS-CCD interface circuit 506, a multiplexer/demultiplexer circuit 704, and the control circuit 510.

The difference between the electronic instrument 700 and the electronic instrument 500 of the first example is that the sound processing IC 702 does not include the audio interface circuit 514 and the output terminal 518 corresponding thereto is not provided.

Therefore, the sound processing IC 702 generates uncompressed data by decoding compressed voice data using GSM-AMR or TwinVQ by the voice interface circuit 516, converts the uncompressed data into an analog signal by D/A conversion, and outputs the voice signal to the speaker 524 through the output terminal 520, for example. The sound processing IC 702 converts a voice signal input from the microphones 528 through the input terminal 526 into a digital signal by A/D conversion, generates compressed data by decoding the digital signal into compressed voice data using GSM-AMR or TwinVQ, and outputs the compressed data to the multiplexer/demultiplexer circuit 704.

The sound processing IC 702 may be designed so that the removable memory card 530 is connected to the electronic instrument 700, and the compressed voice data using GSM-ARM or TwinVQ is stored in the memory card 530.

The multiplexer/demultiplexer circuit 704 demultiplexes the compressed video data in which the display data for the display unit 502 is compressed and compressed audio data or compressed voice data decoded by the sound processing IC 702, from the multiplexed compressed data in which the compressed data corresponding to each medium is multiplexed. The multiplexer/demultiplexer circuit 704 generates multiplexed compressed data by multiplexing video data compressed by the MPEG-4 encoder CMOS-CCD interface circuit 506 and audio data or voice data compressed by the sound processing IC 702.

According to the electronic instrument 700 having the above configuration, in the case where the signal received through the wireless communications network is a bitstream which is the multiplexed compressed data, the bitstream is demultiplexed in a compressed state according to the MPEG-4 standard, for example, and transmitted to the interface ICs for the display section or each input-output device. This significantly decreases the amount of current consumed in driving the bus.

In particular, since each interface IC includes a decoder circuit and an encoder circuit according to the MPEG-4 standard, the number of busses through which uncompressed data corresponding to each medium is transmitted can be decreased, whereby the power consumption can be decreased effectively.

Moreover, allowing each interface IC to include a decoder circuit or an encoder circuit enables applying a decoder circuit or an encoder circuit corresponding to the MPEG-4 profile for the input-output devices to be connected, whereby miniaturization of the equipment and optimization of the configuration can be easily achieved.

2.4 Fourth Example

Figure 11:
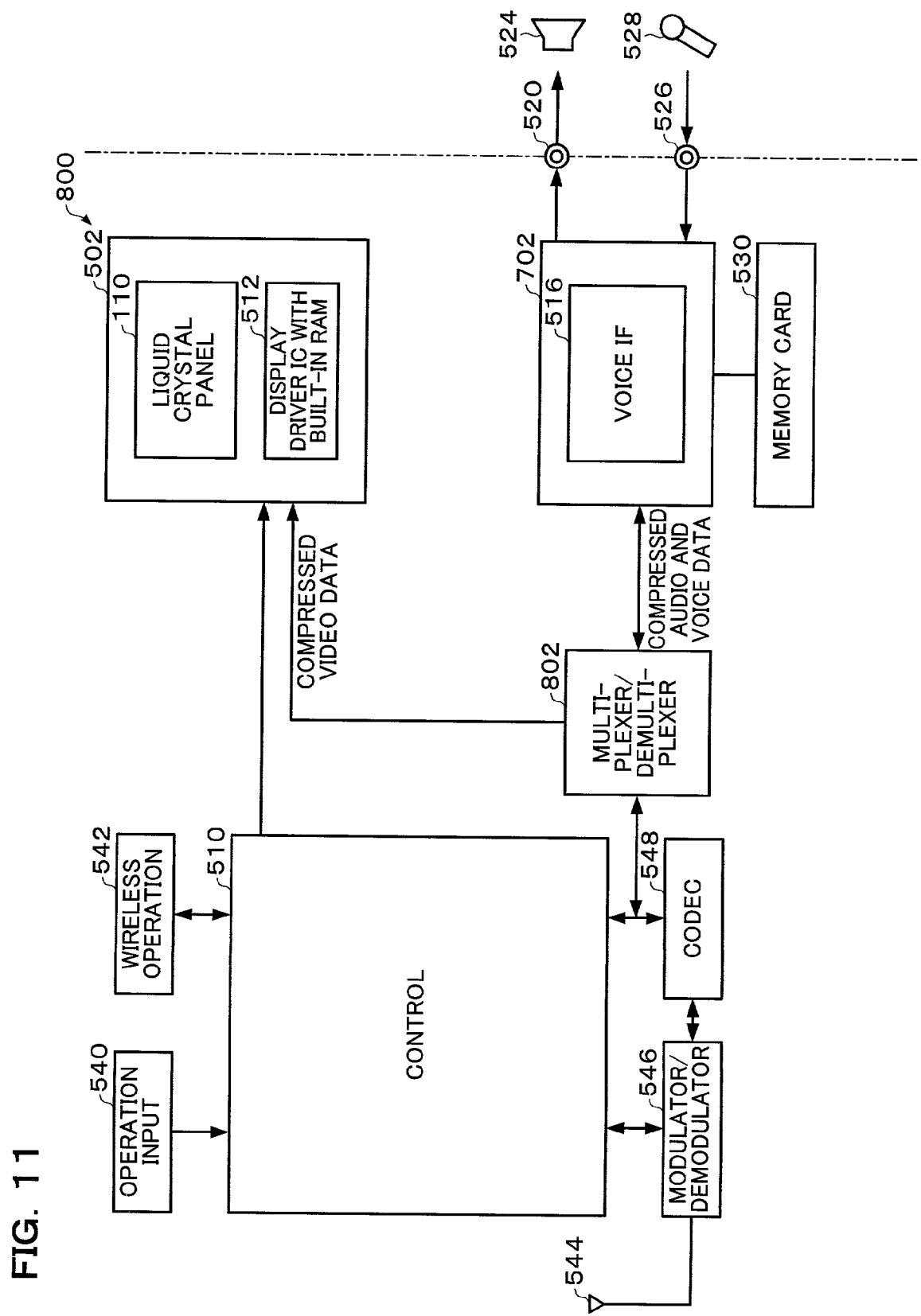
FIG. 11 is a block diagram showing a fourth example of an electronic instrument to which a display driver IC with a built-in RAM according to the embodiment of the present invention is applied.

FIG. 11 shows a fourth example of an electronic instrument to which the display driver IC with a built-in RAM according to the embodiment of the present invention is applied.

Sections the same as those of the electronic instrument of the first example shown in FIG. 8 are indicated by the same symbols. Description of these sections is appropriately omitted.

An electronic instrument 800 includes the display unit 502, the sound processing IC 702, a multiplexer/demultiplexer circuit 802, and the control circuit 510.

The difference between the electronic instrument 800 and the electronic instrument 500 of the first example is that the CMOS-CCD camera interface circuit 506 and the input terminal 532 corresponding thereto are not provided, the sound processing IC 702 does not include the audio interface circuit 514, and the output terminal 518 corresponding thereto is not provided.

Therefore, the multiplexer/demultiplexer circuit 802 demultiplexes compressed video data, in which the display data for the display unit 502 is compressed, and compressed audio data or compressed voice data decoded by the sound processing IC 702, from multiplexed compressed data in which the compressed data corresponding to each medium is multiplexed. The multiplexer/demultiplexer circuit 802 generates multiplexed compressed data by multiplexing voice data compressed by the sound processing IC 702.

According to the electronic instrument 800 having the above configuration, in the case where the signal received through the wireless communications network is the multiplexed compressed data, the multiplexed compressed data is demultiplexed in a compressed state according to the MPEG-4 standard, for example, and transmitted to the interface ICs for the display section or each input-output device. Specifically, each IC inside the equipment can be connected in a state in which the amount of data to be transmitted is decreased, whereby the amount of current consumed in driving the bus can be significantly decreased.

In particular, since each interface IC includes a decoder circuit and an encoder circuit according to the MPEG-4 standard, the number of busses through which uncompressed data corresponding to each medium is transmitted can be decreased, whereby the power consumption can be decreased effectively.

Moreover, allowing each interface IC to include a decoder circuit or an encoder circuit enables applying a decoder circuit or an encoder circuit corresponding to the MPEG-4 profile for the input-output devices to be connected, whereby miniaturization of the equipment and optimization of the configuration can be easily achieved.

Note that the present invention is not limited to the above-described embodiment, and various modifications can be made within the scope of the invention.

In the embodiment of the present invention, circuits for inputting the compressed data through an input terminal and storing it in the display data RAM, and the liquid crystal driver circuit for driving the liquid crystal panel are contained in the same IC. However, the present invention is not limited to such configuration. For example, the liquid crystal driver circuit and the circuits for inputting the compressed data through an input terminal and storing it in the display data RAM may be provided in separate chips. In this case, the structure of the sections leading to the display data RAM can be simplified by separating the liquid crystal driver circuit which must withstand higher voltages, whereby a decrease in costs and power consumption can be achieved.

The embodiment of the present invention relates to FIFO memory, but the present invention is not limited thereto.

The embodiment relates to a configuration in which the display data for one scan line is read for every scan line of the display region from the corresponding storage region of the display data RAM. However, the present invention is not limited thereto. For example, the present invention can be applied to the case where the display data corresponding to a plurality of scan lines is read at the same time, such as in the case of using an MLS drive method. In this case, when writing the display data in each frame, the write operations for the display data of the frame into the storage region of the RAM corresponding to the scan line to be displayed is performed preferentially in comparison with the read operations for the display data from the storage region. Specifically, in the scan line to be displayed, since the display data stored in the storage region for which the read operations are performed has been written in each frame, the display data to be read can be with certainty the new display data in the frame. In the case where the display section is a liquid crystal panel, the liquid crystal panel may be a TFT or active matrix liquid crystal display panel insofar as this condition is satisfied. This means that the present invention can be applied for driving a simple matrix liquid crystal display panel.

What is claimed is:

1. A display driver which drives a display section based on display data read from a built-in random access memory (RAM) in a given read cycle, comprising:

a first-in-first-out (FIFO) memory circuit for sequentially storing compressed data which is obtained by compressing display data and is inputted to the FIIFO memory circuit on a cycle longer than the read cycle, and for outputting the compressed data according to the order of storage;

a decompression circuit which decompresses the compressed data outputted from the FIFO memory circuit on a cycle substantially equivalent to the read cycle;

the RAM which stores the display data of at least one frame, the display data having been outputted from the decompression circuit on the read cycle, wherein the same display data is repeatedly and sequentially read from the RAM during at least two continuous frames; and a display driver circuit which drives the display section based on the display data stored in the RAM, wherein the decompression circuit outputs the display data to a target circuit irrespective of a buffering state of the display data in the target circuit.

2. The display driver as defined in claim 1, wherein:

read of the display data from the RAM by the display driver circuit is performed for every scan line at a given reading speed; and write of the display data decompressed by the decompression circuit into the RAM precedes the read of the display data from the RAM by at least one scan line, and is performed at a speed equal to or higher than the reading speed.

3. The display driver as defined in claim 1,
wherein write of the display data of each frame into a part of storage region of the RAM corresponding to a scan line to be displayed precedes read of the display data from that part of the storage region.

4. The display driver as defined in claim 1, wherein:
the decompression circuit operates based on a given operation clock; and
the display driver includes a circuit which suspends the operation clock in a case where the display data of at least one frame decompressed by the decompression circuit is outputted to the RAM.

5. The display driver as defined in claim 1,
wherein the decompression circuit starts decompression of the compressed data from the FIFO memory circuit, based on a vertical synchronization signal that represents start of read of the display data of one frame from the RAM.

6. The display driver as defined in claim 1, further comprising:
an input terminal to which the compressed data is inputted; and
an output terminal which outputs a signal for driving the display section based on the display data stored in the RAM.

7. The display driver as defined in claim 6, wherein:
the compressed data inputted to the input terminal is obtained by demultiplexing multiplexed data formed by multiplexing one or more types of compressed data; and
the decompression circuit performs decompression based on the compressed data demultiplexed from the multiplexed data.

8. The display driver as defined in claim 1,
wherein the compressed data is compressed according to a given compression standard.

9. A display unit comprising:
the display driver as defined in claim 1, and
a display section driven by the display driver.

10. A display unit comprising:
a panel having an electrooptical element driven by a plurality of first electrodes and a plurality of second electrodes;
the display driver as defined in claim 1 which drives the plurality of first electrodes; and
a scan driver which drives the plurality of second electrodes.

11. An electronic instrument comprising:
the display driver as defined in claim 1;
a demultiplexer circuit which demultiplexes compressed data corresponding to the display driver from multiplexed data obtained by multiplexing one or more types of compressed data to supply the demultiplexed compressed data to the display driver; and
a display section driven by the display driver.

12. The electronic instrument as defined in claim 11, further comprising:
a circuit for transmitting and receiving the multiplexed data through a given communications network.

* * * * *